E. SPARMANN.
AUTOMATIC STABILIZER FOR AERIAL VEHICLES OR OTHER MOVING BODIES.
APPLICATION FILED DEC. 5, 1910.
1,066,860.
Patented July 8, 1913.
5 SHEETS—SHEET 4.
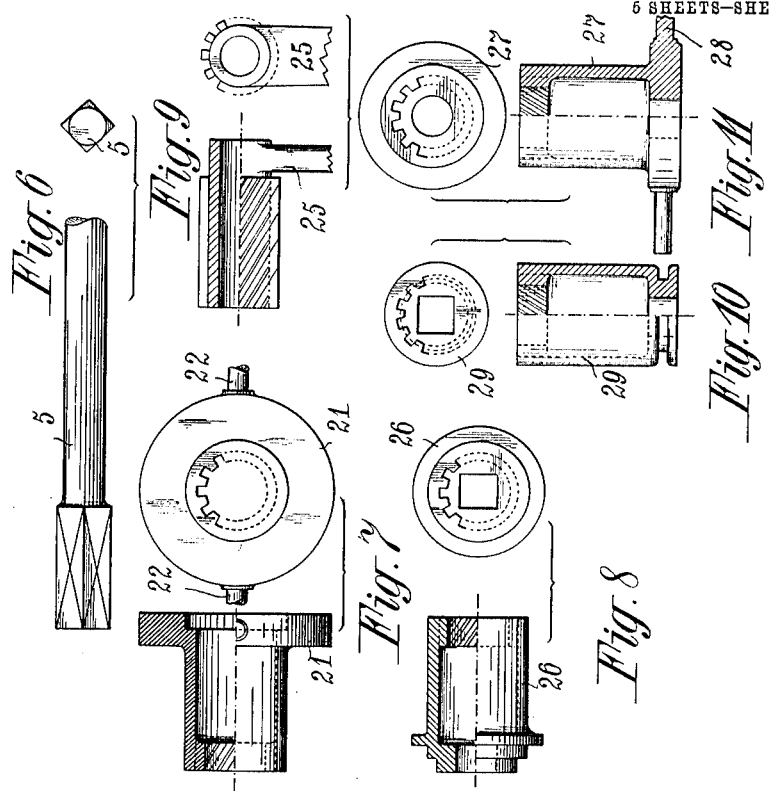
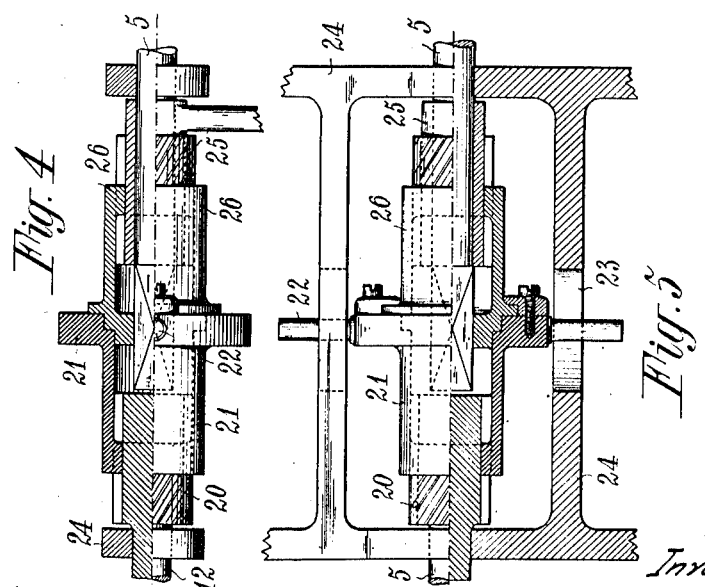
Witnesses:
Inventor
Edmund Sparmann
By B. Singer
Attorney E. SPARMANN.
AUTOMATIC STABILIZER FOR AERIAL VEHICLES OR OTHER MOVING BODIES.
APPLICATION FILED DEC. 5, 1910.
1,066,860.
Patented July 8, 1913.
5 SHEETS—SHEET 5.
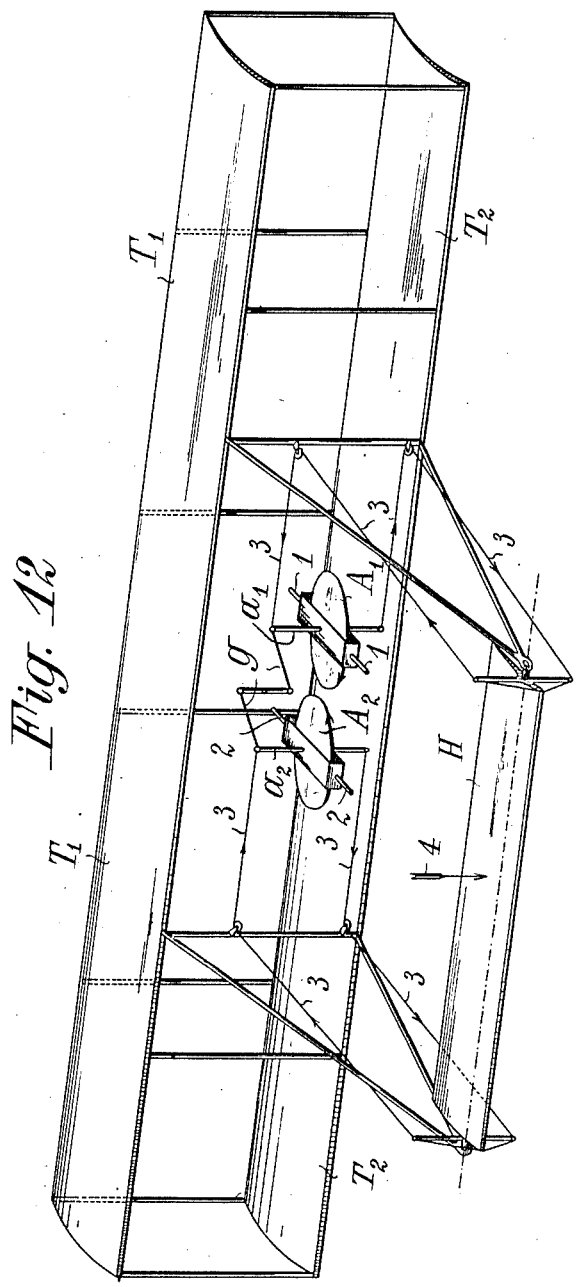

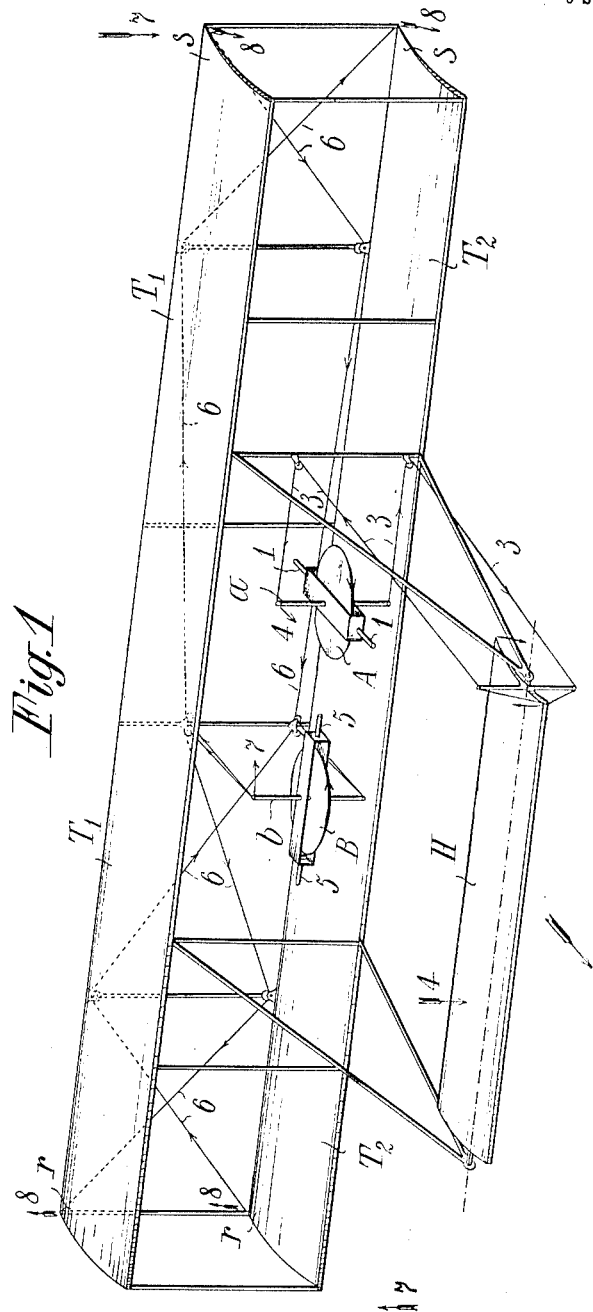

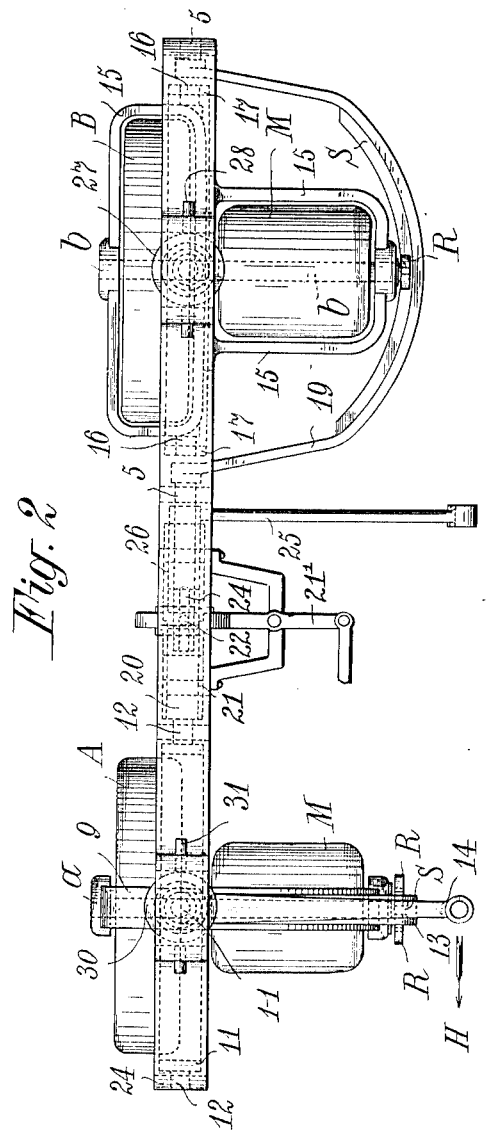

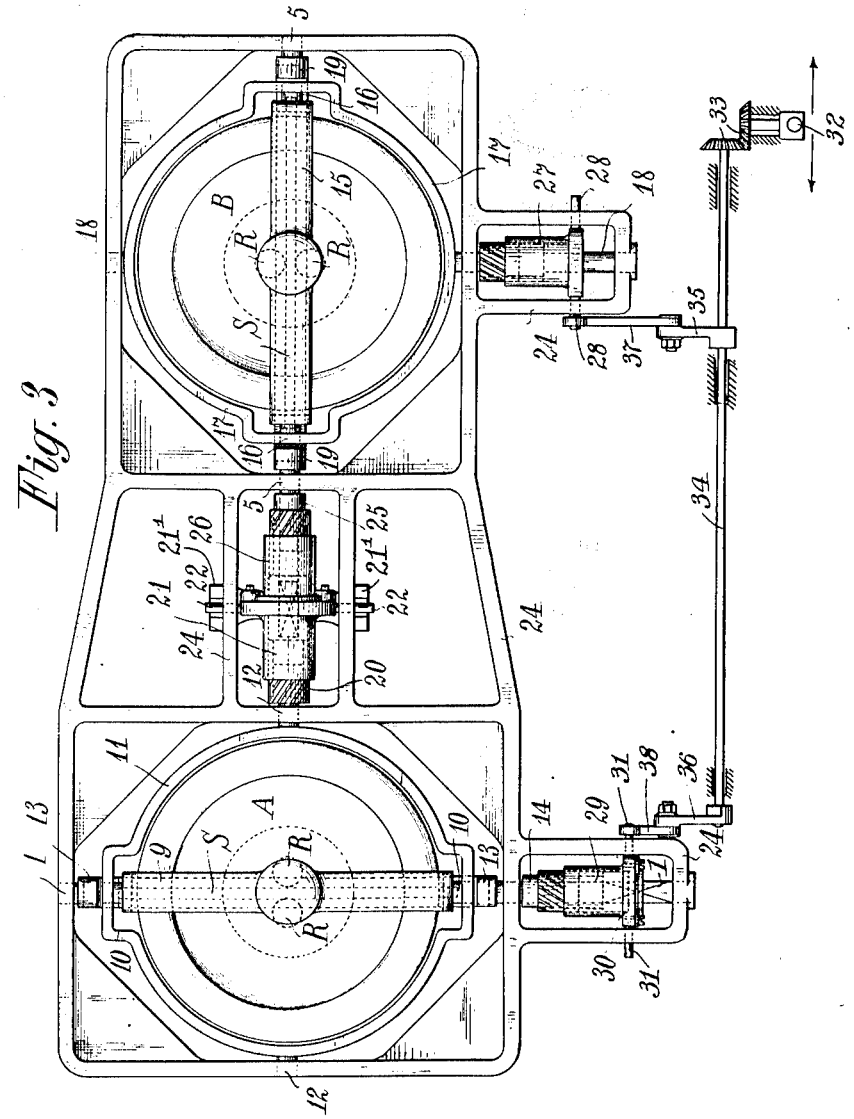

UNITED STATES PATENT OFFICE.

EDMUND SPARMANN, OF VIENNA, AUSTRIA-HUNGARY.

AUTOMATIC STABILIZER FOR AERIAL VEHICLES OR OTHER MOVING BODIES.

1,066,860.   Specification of Letters Patent.   Patented July 8, 1913.

Application filed December 5, 1910. Serial No. 595,837.

*To all whom it may concern:*

Be it known that I, EDMUND SPARMANN, subject of the Emperor of Austria-Hungary, residing at Landesgerichtsstrasse 3, Vienna, VIII, Austria-Hungary, have invented new and useful Improvements in Automatic Stabilizers for Aerial Vehicles or other Moving Bodies, of which the following is a specification.

The invention relates to an apparatus for maintaining the equilibrium of and steering aerial vehicles or other objects, such for example as torpedoes, which is based upon the known property of the gyroscope which has already been utilized for adjusting or steering purposes, this property residing in the fact that a gyroscope rotatable merely about two axes perpendicular to each other (axis of rotation and axis of oscillation) upon experiencing a force which tends to cause it to rotate about a third fixed axis perpendicular to both the other axes, oscillates, that is to say, effects what is called a precessional movement, in such a manner that the axis of rotation of the gyroscope moves perpendicularly to the plane which, prior to the commencement of the movement of precession, was defined by the axis of rotation and the axis of oscillation of the gyroscope, that is to say, so that it moves in a plane passing through the axis of rotation and perpendicularly to the axis of oscillation.

In accordance with the present invention the movements of precession of the gyroscope are transmitted without an auxiliary motor, and only by means of mechanically acting intermediate members, onto the steering members, such as rudders or the like, and in addition in accordance with the present invention, the elevation direction and the angle of lateral inclination can be adjusted at will by means of the gyroscope, for which purpose a self-locking screw gear subjected to the influence of the stabilizer and to that of the steering gear can be interposed between the stabilizer and the devices actuated by same. Provision is also made for adjustment, at will, of the transmission member, acted upon by a gyroscope, to prevent the transmission members of a second gyroscope, acting in another direction, from becoming operative, unintentionally.

The invention further relates to the arrangement of coupled double gyroscopes which are only able to effect symmetrical movements relatively to the vehicle and also means for locking the axes of the gyroscopes for the purpose of stopping the gyratory force.

Embodiments of the invention are illustrated by way of example in the accompanying drawing, in which:—

Figure 1 shows diagrammatically the mounting of the gyroscope in an aeroplane and likewise the movements that they effect and the transmission thereof to the steering surfaces when disturbing forces tend to incline the apparatus in the direction indicated by the arrows. Figs. 2 and 3 illustrate an embodiment of the automatic stabilizer in front elevation and in plan. Figs. 4 to 11 illustrate to a larger scale details of the steering apparatus. Fig. 12 shows diagrammatically the coupling of two gyroscopes, the rods connected with the steering surfaces not being affected by alterations in position which the vehicle makes about an axis running perpendicularly to the axis for controlling which the gyroscopes serve.

In an aeroplane with supporting surfaces $T'$ $T^2$, elevation rudder H and wing tips $r$ $s$ adapted to be warped in accordance with the Wright system, for example, two gyroscopes A B are mounted (Fig. 1) their vertical axes of rotation $a$ and $b$ respectively being capable of oscillating around the horizontal shafts 1—1 and 5—5 respectively, the shaft 1—1 of the gyroscope serving for correcting elements tending to disturb longitudinal stability being mounted in the direction of flight and the axis of oscillation 5—5 of the gyroscope B which serves to regulate lateral stability, running perpendicularly to the direction of flight and horizontally.

The moment of inertia of the gyroscopes must be relatively large because its movement of precession is intended to adjust the rudder; such gyroscopes also exert great gyratory force and therefore have the advantage that they largely damp the oscillations of the vehicle. The gyroscopes act directly without an auxiliary motor on the steering surfaces or the like, so that as compared with the steering by means of auxiliary motor the weight of the latter is economized, whereby the increased weight due to larger gyroscopes is counterbalanced; in addition, the magnitude and velocity of the regulating effect are dependent upon the disturbing force, the latter at once making itself felt on the steering members, while with an auxiliary motor it is first of all necessary to operate a starting or switching device and some interval of time is necessary for the starting of the motor. Another advantage of the direct transmission lies in the independence of the automatic stabilizing from the operation of the motor for driving the vehicle.

Each of the gyroscopes acts through cables 3 and 6 respectively or rods directly upon the stabilizing surfaces, that is to say, in the example illustrated, on the elevation rudder H and the tips $r$ $s$ of the supporting surfaces which are adapted to be warped. Consequently when some disturbing force, such as a gust of wind, movements on the part of the crew or the like, arise and tend to cause the vehicle to incline in the direction indicated by the arrow 4, the gyroscope A moves in the direction of the arrows indicated on the cables about the shaft 1—1 and displaces the cables in such a manner that the rudder H counteracts the force tending to impair longitudinal stability by increasing the angle of incidence. Similarly the lateral stabilizing gyroscope B acts on the cables 6 in the direction of the arrows marked when some force tends to turn the apparatus in the direction of the arrows 7.

When separate gyroscopes are provided for maintaining the stability it is essential that one should always be provided in the vehicle for longitudinal stabilizing and one for transverse stabilizing because if only one gyroscope would be employed for maintaining transverse stability, for example, and the longitudinal axis of the vehicle was turned upward or downward, the gyroscope would act at an inopportune moment, upon the surfaces for producing transverse stability, because with such a displacement of the longitudinal axis of the vehicle, the interval between the gyroscope axis $b$, which remains fixed in space, and a point on the vehicle to which the cables are carried increases or diminishes which results in displacement of the cables, that is to say actuation of the transverse stabilizing surfaces. On the other hand the gyroscope device serving for maintaining longitudinal stability would exert an undesirable action when the transverse axis of the vehicle was arbitrarily displaced as in curves, for example. In order to prevent this each stabilizing gyroscope unit is composed of two coupled gyroscopes or the levers or the like serving for connecting the gyroscope with the cables are displaced simultaneously with the arbitrary steering when an arbitrary displacement of the second axis controlled by the other gyroscope is to take place.

A coupled gyroscope unit is represented by way of example in Fig. 12 for controlling the elevation rudder. The axis of rotation $a'$ $a^2$ of the two gyroscopes A' A² are connected one with the other by means of a rod $g$ (or gear wheels or the like) in such a manner that they are only able to effect symmetrical movements about the axes 1—1 and 2—2. In this case, when some disturbing force tends to alter the elevation, symmetrical precessional movement of the gyroscope would be initiated. Inasmuch as the gyroscopes, owing to the couplings $g$, can only assume symmetrical positions to the vertical plane of symmetry of the aeroplane, they, the gyroscopes, follow the swinging movement of the aeroplane to the same extent, and to such a rotation of the plane of symmetry, respectively, of the axis of rotation of the gyroscope about an axis which is parallel with the axis of oscillation. The coupled double gyroscopes oppose no resistance because they rotate in opposite directions, are rotated in the same direction as the disturbing force and consequently exert oppositely directed precession pressures which, however, cancel each other owing to the rigidity of the supporting frame. When, however, in the case of a single gyroscope no precessional movement is possible there is also no directing force perpendicularly to the same so that lateral inclination would not be prevented.

As the coupled double gyroscopes do not oppose any resistance to a rotation about axes running parallel with the axes of oscillation these axes of oscillation or the axes of rotation can be arranged at any desired inclination provided they are mounted in a plane perpendicular to the stabilizing axis, that it to say the axes of rotation of the gyroscopes effect their movements of oscillation in a plane passing through the axis to be stabilized or parallel therewith. Consequently the elevation gyroscopes for example must present horizontally mounted axes of oscillation as shown in Fig. 12. Of course coupled double gyroscopes can be employed in an analogous manner as the parts for maintaining the lateral stability or the course.

In order to explain the adjustability, already referred to, of the lever of a stabilizing gyroscope connected with the cables, when the other steering is actuated arbitrarily the construction of the stabilizer will now be described.

Each of the two gryoscopes A and B for longitudinal stability (acting upon the elevation) and for obtaining lateral stability has its vertical axis $a$ and $b$ respectively mounted in vertical rings 9 and 15 respectively and is given a speedy movement of rotation by means of an electric motor M mounted inside the ring for example. The vertical rings 9 and 15 are rotatably mounted on trunnions 10 and 16 in horizontal rings 11 and 17 respectively, the trunnions 10 of the ring 9 running parallel with the longitudinal axis and the trunnions 16 of the ring 15 at right angles to the longitudinal axis. Each of the horizontal frames or rings 11, 17 is mounted by means of horizontal trunnions 12 and 18 respectively in the frame 24 common to both of them, these trunnions experiencing no rotation in so far as concerns the automatic stabilizing but they can be rotated arbitrarily by the steersman for the purpose of displacing their horizontal rings, whereby alterations of the elevation or alterations of the lateral inclination are obtained. For example, if it be desired to modify the inclination arbitrarily, this would be opposed by the gyratory force of the gyroscope (the gyroscope A as regards elevation and the gyroscope B as regards lateral steering). Consequently it must be possible to alter the angle between the axis of the gyroscope and the aerial apparatus (or the like such as a submarine boat for example) in accordance with the desired alteration of the elevation or of the lateral direction; this takes place in such a manner that the said apparatus rotates about the gyroscope fixed in place by its gyratory force and owing to the inertia of the apparatus the gyroscope effects a precessional movement which adjust the steering surfaces or the like, in such a manner that they tend to rotate the apparatus in the same direction.

In order to transmit the precessional movement taking place about the trunnions 10 and 16 of the gyroscopes A and B respectively, the oscillation of the vertical ring 9 or 15 is transmitted by means of rollers R arranged thereon, to a rail S of the yoke 13 or 19. The center of curvature of this rail is located at the point where the axis of the gyroscope intersects the horizontal plane passing through the corresponding trunnions 12 or 18 so that the rollers R are able to slide along the rails. The yokes 13 and 19 are mounted by means of shafts 1 and 5 on which the levers 14 and 25 are mounted in the frame 24; these levers actuate the cables or the rods connected with the elevation rudder or the lateral stabilizing surfaces. These levers can be rocked on their shaft, in the present example, the lever 14 rocking about its shaft 1 when the lateral stabilizing gyroscope device B is displaced about the trunnions 18 and the lever 25 is rocked about its shaft 5 when the steersman wishes to produce an alteration in the elevation by rotating the trunnion 12 of the gyroscope A. In order to produce this latter result the forked elevation lever 21′, or its equivalent displaces axially the nut 21, the pins 22 of which are guided in slots 23 in the frame 24 and engaged by the forked lever (Figs. 3 and 4); this produces rotation of the shaft 12 which is formed as a steep pitched screw 20, which on the one hand produces an adjustment of the angle (starting angle) between the axis of rotation of the gyroscope and the aerial apparatus and on the other hand a precessional movement of the gyroscope axis $a$ and actuates the elevation rudder.

The screw 20 is so steep in pitch that it automatically prevents rotation of the shaft 12 by the ring 11, that is to say, when a rotary force is exerted upon the screw bolt 12, the axially acting component is smaller than the friction and therefore is unable to displace the screw nut. As in this modification of the elevation, the aerial apparatus also rotates about the gyroscope B, the position of the lever 25, relatively to the steering members, would alter or change, which would cause undesirable actuation of the lateral inclination steering gear and consequently unintentional lateral inclination of the vehicle. In the aeroplane represented in the figures, by way of example, the steering members comprise portions $r$, $s$, of the supporting plane, which are adapted to be warped. In order to prevent such unintentional lateral inclination of the lever 25 or some part serving the same purpose it is constructed in such a manner that it can be influenced by means of a self-locking screw gear not only by the stabilizer B but also by the arbitrary steering gear. In accordance with the construction illustrated, the lever 25 is mounted on the shaft 5 (Fig. 6) in such a manner as to be rotatable but not displaceable axially; on the outside of its hub it is provided with a steep pitched screw (Fig. 9) and can be rocked by means of the screw nut 26, guided along a quadrilateral part of the shaft 5, and as this displacement is to take place simultaneously with the rotation of the shaft 12 it is preferable to connect the nuts 21 and 26 axially one with the other (Figs. 4 and 5) although independent rotary movement must be insured for the nut 26 so that it can rotate its lever 25 with automatic lateral stabilizing also.

A very analogous device is employed for altering the lateral inclination, as is necessary in curves, which alteration the automatic stabilizer would otherwise prevent. For this purpose the shaft 18 is rotated by means of the displaceable nut 27 which is likewise provided with a screw thread of steep pitch and which is prevented from rotation by studs 28 guided in slots in the frame, the latter being displaced by the steersman by means of a lever or wheel. Here also the relative alteration in position between the lever 14 and the vehicle must be taken into account; this would occur in arbitrarily altering the lateral inclination and consequently means are provided by which rocking of the lever 14 independently of the shaft 1 and gyroscope A can be produced. With this object the lever 14 is freely mounted but so as to be immovable axially on the round part of the shaft 1, while the angular part of this shaft serves to guide the nut 29 (Figs. 3 and 10); this nut is likewise guided by the studs 31 in slots in the frame 24. As, however, it must also rotate when the gyroscope A acts automatically on the elevation rudder in order to transmit its movement of rotation to the lever 14 the guide studs 31 are arranged on a ring 30 engaging in an annular groove on the sleeve. The steering hand lever 32 for lateral inclination drives, by a gearing 33, the shaft 34, carrying cranks 35 and 36. Crank 35 is connected by means of a link 36 with the stud 28, of the nut 27 and crank 36 is connected by means of link 38 with the stud 31. It is therefore possible to adjust the lever 14 at the same time that the nut 27 is moved by the operator. Finally, in order to deprive the gyroscopes of their directing force during full rotation, means (such for example as brakes, locking mechanisms or the like) can be provided in this double gyroscope stabilizer by means of which the shafts 1—1, 2—2, 5—5, can be held and the precessional movements consequently prevented.

I do not limit myself to the employment of the screw and nut having such a steep pitch that when a rotary force is exerted upon the screw bolt, the axially acting component is unable to displace the screw nut (automatic locking screw bolt) in connection with the stabilizing device described, because such an automatic locking screw may also be used in combination with other types of automatic stabilizing devices.

I claim—

1. In an automatic stabilizer for aerial vessels for other moving bodies, the combination with suitable framework, of movable means carried by said framework for stabilizing the body with respect to one of its axes, of a ring pivotally carried by said framework with its axis of rotation extending at right angles to the axis of the body with respect to which the vessel is stabilized by said means, a second ring pivotally carried by said first mentioned ring and having its axis of rotation at right angles to the axis of the latter, a gyroscopic wheel carried by said second mentioned ring, a yoke pivotally carried by said framework with its axis of rotation at right angles to that of the said first mentioned ring, means operatively connecting said second mentioned ring and said yoke to transmit movement of the former to the latter, and means for transmitting movement of said yoke to said first mentioned means, substantially as and for the purpose set forth.

2. In an automatic stabilizer for aerial vessels or other moving bodies, the combination with suitable framework, of movable means carried by said framework for stabilizing the body with respect to one of its axes, a ring pivotally carried by said framework with its axis of rotation extending at right angles to the axis of the body with respect to which it is stabilized by said means, a second ring pivotally carried by said first mentioned ring and having its axis of rotation at right angles to the axis of the latter, a gyroscopic wheel carried by said second mentioned ring, a yoke, provided with a rail, pivotally carried by said framework with its axis of rotation at right angles to that of said first mentioned ring, rollers carried by said second mentioned ring for co-acting with said rail of said yoke to transmit movement of the former to the latter, and means for transmitting movement of said yoke to said first mentioned means, substantially as and for the purpose set forth.

3. In an automatic stabilizer for aerial vessels or other moving bodies, the combination with suitable framework, of a movable means carried by said framework for stabilizing the body with respect to one of its horizontal axes, a second movable means carried by said framework for stabilizing the body with respect to the other horizontal axis, two rings, a ring pivotally carried by each of said first mentioned rings, mechanism pivoting the said first mentioned ring to said framework, one with its axis at right angles to the longitudinal axis of the body and the other at right angles to the transverse axis of the body, the axis of rotation of said first mentioned ring being at right angles to the axis of the respective rings carried thereby, a gyroscopic disk carried by each of said second mentioned rings and each disk having substantially a horizontal plane of rotation, a yoke for each gyroscopic disk pivotally carried by said framework at right angles with respect to the first mentioned ring thereof, means for transmitting movement of said second mentioned ring of each gyroscopic disk to said yoke, a pivoted yoke lever for each gyroscopic disk, the levers being adapted for connection to said first and second mentioned means for independently actuating the same, an instrumentality for transmitting movement of the yoke of either one of said gyroscopic disks to its respective lever and simultaneously altering the plane of rotation of the other gyroscopic disk with respect to the horizontal plane of the body, or for manually actuating either of said levers independently of its respective gyroscope, substantially as and for the purpose set forth.

4. In an automatic stabilizer for aerial vessels or other movable bodies, the combination with suitable framework, of a movable means carried by said framework for stabilizing the body with respect to one of its horizontal axes, a second movable means carried by said framework for stabilizing the body with respect to the other horizontal axis, two rings, a ring pivotally carried by each of said first mentioned rings, mechanism pivoting said first mentioned rings to said framework, one with its axis at right angles to the longitudinal axis of the body and the other with its axis at right angles to the transverse axis of the body, the axis of rotation of said first mentioned ring being at right angles to the axis of the respective rings carried thereby, a gyroscopic disk carried by said second mentioned rings and each disk having a horizontal plane of rotation, a yoke, having a track, for each gyroscopic disk pivotally carried by said framework at right angles with respect to the first mentioned ring thereof, rollers, for coaction with said tracks, carried by said second mentioned ring for transmitting movement of the latter to said yokes, a pivoted lever for each gyroscopic disk, the levers being adapted for connection to said first and second mentioned means for independently actuating the same, an instrumentality for transmitting movement of the yoke of either one of said gyroscopic disks to its respective lever and simultaneously altering the plane of rotation of the other gyroscopic disk with respect to the horizontal plane of the body, or for manually actuating either of said levers independently of its respective gyroscope, substantially as and for the purpose set forth.

5. An automatic stabilizing means for aerial vessels or other moving bodies, the combination with two gyroscopic mechanisms, a stabilizing plane and mechanism for actuating said plane, of a shaft actionable by one of said gyroscopic mechanisms and provided with a keying portion, a lever loosely carried by said shaft but not actually movable with respect thereto, said lever being provided with a threaded portion about said shaft and adapted for connection to said stabilizing plane, a second shaft adapted to alter the plane of rotation of the other gyroscopic mechanism, such shaft being provided with a threaded cylindrical portion disposed concentric to said second mentioned shaft, a two part collar having separate threaded portions engaging each of the said threaded portions of said lever and shaft and one part of said collar being operatively connected to the keying portion of said first mentioned shaft to be actuated by oscillation thereof, and means for bodily shifting said collar actuating said shaft, substantially as and for the purpose set forth.

6. In an automatic stabilizing machine for aerial vehicles or other moving bodies, the combination with two gyroscopic mechanisms, stabilizing planes and mechanism for actuating said planes, of a shaft actionable by one of said gyroscopic mechanisms and provided with a keying portion, a lever loosely carried by said shaft but not actually movable with respect thereto, said lever being provided with a steep pitched screw about said shaft, and adapted for connection to said stabilizing plane, a second shaft adapted to alter the plane of rotation of the other gyroscopic mechanism, such shaft being provided with a cylindrical portion provided with a steep pitched screw portion disposed concentric to said first mentioned shaft, a two part collar having separate threaded portions engaging each of the said threaded portions of said lever and shaft and one part operatively connected to the keying portion of said first mentioned shaft to be actuated by oscillation thereof, and means for bodily shifting said collar actuating said shaft, substantially as and for the purpose set forth.

7. In automatic stabilizing means for aerial vehicles or other moving bodies, the combination with suitable framework, of a movable means carried by said framework for stabilizing the body with respect to its longitudinal axis, a second movable means carried by said framework for stabilizing the body with respect to its transverse axis, two rings, a ring pivotally carried by each of said first mentioned rings, mechanism pivoting said first mentioned rings to said framework, one with its axis at right angles to the longitudinal axis of the body and the other at right angles to the transverse axis of the body, the axis of rotation of the said first mentioned ring being at right angles to the respective rings carried thereby, a gyroscopic disk carried by each of said second mentioned rings and each disk having substantially a horizontal plane of rotation, a yoke for each gyroscopic disk pivotally carried by said framework at right angles with respect to the first mentioned ring thereof, means for transmitting movement of said second mentioned ring of each gyroscopic disk to said yoke, a shaft for each yoke and movable therewith, said shaft being provided with keying portions, a lever loosely carried by each of said shafts but not movable with respect thereto, said levers being provided with a threaded portion about said shaft and adapted for connection to said first and second mentioned means, for independently actuating the same, a second shaft for each of said first mentioned rings adapted to alter the plane of rotation of either gyroscopic disk, such shaft being provided with a threaded portion, a nut in engagement with the threaded portion of said first mentioned shaft and the threaded portions of said second mentioned shaft, the nuts of said first mentioned shaft being in engagement with the said keying portions thereof to be actuated by movement of said yokes, means operatively connecting the alternate nuts of each gyroscopic disk to move in unison, and means for bodily shifting said nuts, substantially as and for the purpose set forth.

8. In an automatic stabilizer for aerial or other movable bodies, the combination of a body with a vertical symmetric plane, means for stabilizing said body adapted to prevent inclinations about one of its horizontal axes, two gyroscopic wheels symmetrically disposed to a plane extending through the vertical axes of the body, a manual steering lever, cardanic rings rotatable about parallel axes, said rings carrying screws and being positively connected with said manual steering lever, said screws having axes which are parallel to that axis of the body about which inclination is to be prevented, a second pair of cardanic rings carrying screws and perpendicularly arranged with respect to said first-mentioned screws and connected by suitable means with those steering planes which are intended to prevent oscillations of the aeroplane around that axis which is parallel to the screw members of the first-named cardanic rings.

In testimony whereof I have signed my name to this specification in the presence of two subscribing witnesses.

EDMUND SPARMANN.

Witnesses:
RICHARD KOMINIK,
AUGUST FUGGER.